(12) United States Patent  
Kumagai (10) Patent No.: US 9,114,670 B2  
(45) Date of Patent: Aug. 25, 2015

(54) MULTIFUNCTION RECEIVER

(71) Applicant: KABUSHIKI KAISHA TOKAI RIKA DENKI SEISAKUSHO, Aichi (JP)

(72) Inventor: Katsuhide Kumagai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 218 days.

(21) Appl. No.: 13/896,604

(22) Filed: May 17, 2013

(65) Prior Publication Data

US 2013/0321140 A1    Dec. 5, 2013

(30) Foreign Application Priority Data

May 30, 2012    (JP) .................................. 2012-123271

(51) Int. Cl.
*B60R 25/10* (2013.01)
*B60C 23/04* (2006.01)
*G07C 9/00* (2006.01)

(52) U.S. Cl.
CPC ......... *B60C 23/0479* (2013.01); *B60C 23/0418* (2013.01); *B60C 23/0435* (2013.01); *G07C 9/00309* (2013.01); *G07C 2009/00793* (2013.01)

(58) Field of Classification Search
CPC ................................................ B60C 23/0479
USPC .................................... 340/445, 447; 701/36
See application file for complete search history.

(56) References Cited

U.S. PATENT DOCUMENTS

| | | | |
|---|---|---|---|
| 7,952,472 B2 | 5/2011 | Okada et al. | |
| 2005/0191966 A1 | 9/2005 | Katsuta | |
| 2007/0021082 A1 | 1/2007 | Okumura et al. | |
| 2007/0046427 A1* | 3/2007 | Ghabra et al. | 340/5.61 |
| 2009/0102634 A1* | 4/2009 | Okada et al. | 340/442 |
| 2009/0203340 A1 | 8/2009 | Gauthier et al. | |
| 2011/0254660 A1* | 10/2011 | Sun | 340/5.61 |
| 2012/0064830 A1 | 3/2012 | Okada et al. | |
| 2013/0021149 A1 | 1/2013 | Shibagaki | |
| 2013/0029623 A1* | 1/2013 | Murakami et al. | 455/226.1 |

FOREIGN PATENT DOCUMENTS

| | | |
|---|---|---|
| JP | 4552995 | 9/2010 |
| JP | 2012-062621 | 3/2012 |

OTHER PUBLICATIONS

Search report from E.P.O., mail date is Sep. 9, 2013.
Japan Office action in Japan Patent Application No. 2012-123271, mail date is Apr. 14, 2015.

* cited by examiner

*Primary Examiner* — Brent Swarthout
(74) *Attorney, Agent, or Firm* — Greenblum & Bernstein, P.L.C.

(57) ABSTRACT

A multifunction receiver shared by an electronic key system and a tire pressure monitoring system. The electronic key system verifies an electronic key with a verification control unit of a vehicle body through wireless communication, and the tire pressure monitoring system monitors tire pressure of a tire by transmitting a tire pressure signal from a sensor arranged on the tire to the vehicle body through wireless communication. The multifunction receiver includes a trigger signal generation unit that generates a trigger signal when a level shift occurs in at least one of a first operation mode switch signal and a second operation mode switch signal from the verification control unit. A mode setting unit sets an operation mode based on the first operation mode switch signal and the second operation mode switch signal in response to the trigger signal received from the trigger signal generation unit.

7 Claims, 7 Drawing Sheets

MULTIFUNCTION RECEIVER

CROSS-REFERENCE TO RELATED APPLICATIONS

This application is based upon and claims the benefit of priority from prior Japanese Patent Application No. 2012-123271, filed on May 30, 2012, the entire contents of which are incorporated herein by reference.

BACKGROUND ART

The present invention relates to a multifunction receiver capable of receiving radio waves from both of an electronic key system and a tire pressure monitoring system.

An electronic key system may be installed in a vehicle to verify an electronic key through wireless communication between the vehicle and the electronic key. A key-free operation system is a known electronic key system that performs narrowband wireless communication when, for example, receiving radio waves from a vehicle. Further, a tire pressure monitoring system (TPMS) may also be installed in a vehicle. In a tire pressure monitoring system, a tire pressure sensor is arranged in each tire to detect the air pressure of the tire. The tire pressure monitoring system receives a detection signal through wireless communication from each tire pressure sensor to monitor the air pressure of each tire.

In current systems, the frequency of the radio waves transmitted from an electronic key and the frequency of the radio waves transmitted from the tire pressure sensors are both set in the ultrahigh frequency (UHF) band. Further, to reduce the number of components, a receiver mounted on a body of a vehicle may be a multifunction receiver shared by the electronic key system and the tire pressure monitoring system (refer to, for example, Japanese Patent No. 4552995).

Such a multifunction receiver is operated in modes set in accordance with a smart reception request signal and a smart frequency switch signal provided from a verification electronic control unit (ECU) of the electronic key system. For example, the multifunction receiver is normally set in a TPMS communication mode and functions as a receiver for the tire pressure monitoring system. When the multifunction receiver receives the smart reception request signal from the verification ECU, the operation mode of the multifunction receiver is switched to a smart communication mode to function as a receiver for the electronic key system. In the smart communication mode, the multifunction changes a reception frequency when receiving the smart frequency switch signal from the verification ECU.

In case the smart reception request signal becomes fixed at a high level or a low level, the multifunction receiver will not be able to switch operation modes in a normal manner. Accordingly, there is a demand for a multifunction receiver that switches operation modes even when the smart reception request signal becomes fixed. The same problem also occurs when the smart frequency switch signal becomes fixed.

SUMMARY OF THE INVENTION

One aspect of the present invention is a multifunction receiver shared by an electronic key system and a tire pressure monitoring system. The electronic key system verifies an electronic key with a verification control unit of a vehicle body through wireless communication, and the tire pressure monitoring system monitors tire pressure of a tire by transmitting a tire pressure signal from a sensor arranged on the tire to the vehicle body through wireless communication. The multifunction receiver includes a trigger signal generation unit that generates a trigger signal when a level shift occurs in at least one of a first operation mode switch signal and a second operation mode switch signal from the verification control unit. A mode setting unit sets an operation mode based on the first operation mode switch signal and the second operation mode switch signal in response to the trigger signal received from the trigger signal generation unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A multifunction receiver according to one embodiment of the present invention will now be described with reference to FIGS. 1 to 7.

Figure 1:
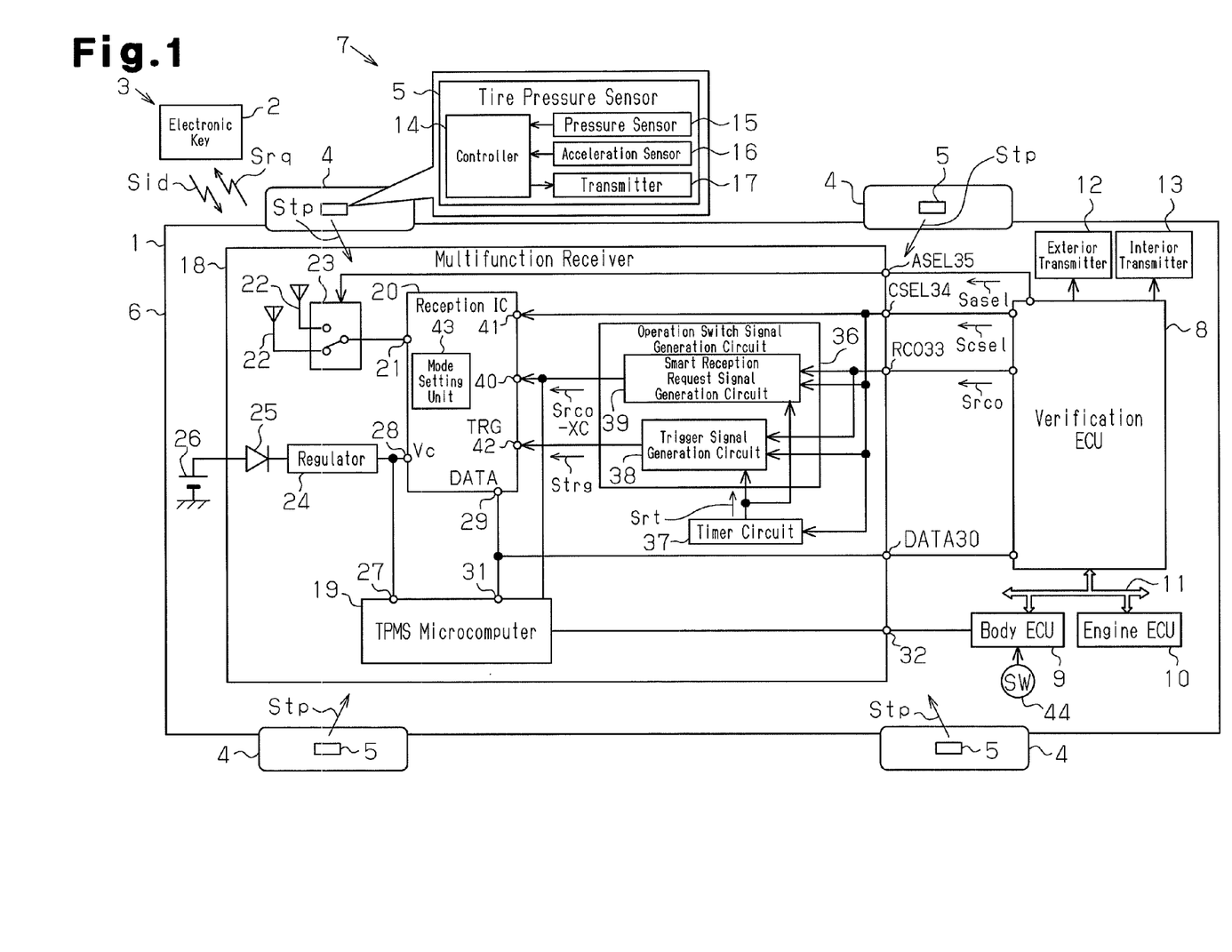
FIG. 1 is a schematic diagram of an electronic key system and a tire pressure monitoring system.

Referring to FIG. 1, a vehicle 1 is provided with an electronic key system 3 that performs key verification (ID verification) through wireless communication between the vehicle 1 and an electronic key 2. The electronic key system 3 of the present example is a key-free operation system that performs ID verification (smart verification) through narrowband communication (communication distance: several meters) when the electronic key 2 receives radio waves from the vehicle 1 and permits operation of an in-vehicle device when ID verification is accomplished. The vehicle 1 is also provided with a tire pressure monitoring system 7 including a tire pressure sensor 5 (also referred to as tire valve) arranged on each tire 4. The tire pressure monitoring system 7, which is arranged on a vehicle body 6, receives a tire pressure signal Stp from each tire pressure sensor 5 and monitors the tire pressure of each tire 4. The tire pressure sensor 5 serves as a sensor unit.

The vehicle body 6 includes a verification ECU 8, which verifies the electronic key 2 in the electronic key system 3, a body ECU 9, which manages power for in-vehicle devices, and an engine ECU 10, which controls the engine. An in-vehicle bus 11 connects the verification ECU 8, the body ECU 9, and the engine ECU 10. The electronic key 2 and the verification ECU 8 each include a memory (not shown) that stores an electronic key ID. The vehicle body 6 includes an exterior transmitter 12, which transmits radio waves on a low frequency (LF) band to the exterior of the vehicle 1, and an interior transmitter 13, which transmits radio waves on the LF band to the interior of the vehicle 1. The exterior transmitter 12 and the interior transmitter 13 are connected to the verification ECU 8. The verification ECU 8 corresponds to a verification control unit.

Each tire pressure sensor 5 includes a controller 14 that controls the tire pressure sensor 5, a pressure sensor 15 that detects the air pressure of the corresponding tire 4, an acceleration sensor 16 that detects rotational acceleration of the corresponding tire 4, and a transmitter 17 that transmits radio waves on the UHF band. The controller 14 includes a memory (not shown) that stores a tire ID (valve ID) unique to the tire pressure sensor 5. The controller 14 obtains the tire pressure from the detection signal of the pressure sensor and periodically transmits a tire pressure signal Stp. Further, when the controller 14 determines that the tire 4 has started to rotate from the detection signal of the acceleration sensor 16, that is, the vehicle 1 has started to travel, the controller 14 transmits a tire pressure signal Stp to the vehicle body 6. The tire pressure signal Stp includes the tire ID, tire pressure data, and the like.

A multifunction receiver 18 is arranged on the vehicle body 6 to serve as a receiver that receives radio waves on the UHF band and is shared by the electronic key system 3 and the tire pressure monitoring system 7. The multifunction receiver 18 is electrically connected to the verification ECU 8 and the body ECU 9. The multifunction receiver 18 receives UHF radio waves transmitted from the electronic key 2 and UHF radio waves transmitted from each tire pressure sensor 5. Further, the multifunction receiver 18 is operable in operation modes including a smart communication mode and a TPMS communication mode.

In the smart communication mode, the multifunction receiver 18 sets the reception frequency to one of two signal transmission frequencies (e.g., 312 MHz and 314 MHz) to receive radio waves transmitted from the electronic key 2. The smart communication mode is referred to as the first smart communication mode when the multifunction receiver 18 sets the reception frequency to the same frequency as a first transmission frequency (314 MHz) of the electronic key 2. Further, the smart communication mode is referred to as the second smart communication mode when the multifunction receiver 18 sets the reception frequency to the same frequency as a second transmission frequency (312 MHz) of the electronic key 2.

In the TPMS communication mode, the multifunction receiver 18 sets the reception frequency to the same frequency as the transmission frequency of the tire pressure sensors 5 to receive radio waves transmitted from the tire pressure sensors 5. The TPMS communication mode corresponds to a first mode, and the smart communication mode corresponds to a second mode.

The multifunction receiver 18 includes a TPMS microcomputer 19, which has the multifunction receiver 18 receive radio waves from the tire pressure monitoring system 7, and a reception integrated circuit (IC) 20, which demodulates and amplifies the received radio waves. The reception IC 20 includes an antenna connection terminal 21 connected to a plurality of (two in the present example) reception antennas 22 by a switch 23. The antennas 22 include, for example, an interior antenna arranged in the vehicle 1 and a trunk antenna arranged in the trunk. The switch 23 selectively connects one of the reception antennas 22 to the reception IC 20.

Further, the multifunction receiver 18 includes a regulator 24 that regulates power. The regulator 24 includes an input connected to a battery 26 by a diode 25 and an output connected to a power terminal 27 of the TPMS microcomputer 19 and a power terminal 28 of the reception IC 20. The regulator 24 supplies the TPMS microcomputer 19 and the reception IC 20 with power voltage Vc (e.g., 5 V).

The reception IC 20 includes a data output terminal 29 connected to the verification ECU 8 by a data output terminal 30 of the multifunction receiver 18 and to a data input terminal 31 of the TPMS microcomputer 19. The reception IC 20 provides reception data to the verification ECU 8 and the TPMS microcomputer 19 from the data output terminal 29. The TPMS microcomputer 19 is connected to the body ECU 9 by a control terminal 32 of the multifunction receiver 18.

The multifunction receiver 18 includes a smart reception request signal input terminal 33 that receives a smart reception request signal Srco from the verification ECU 8.

The smart reception request signal Srco, which is a pulse signal having predetermined pulses, requests the multifunction receiver 18 to switch to the smart communication mode and function as a receiver for the electronic key system 3. The smart reception request signal Srco corresponds to a first operation mode switch signal (function switch signal). The smart communication mode corresponds to a second mode.

Further, the multifunction receiver 18 includes a smart frequency switch signal input terminal 34 that receives a smart frequency switch signal Scsel from the verification ECU 8. The smart frequency switch signal Scsel, which is a pulse signal having predetermined pulses, requests the reception IC 20 to switch the reception frequency in the smart communication mode. The smart frequency switch signal Scsel corresponds to a second operation mode switch signal (frequency switch signal).

The multifunction receiver 18 selects an operation mode based on the smart reception request signal Srco and the smart frequency switch signal Scsel, which are provided from the verification ECU 8. For example, in a basic mode switching operation, the multifunction receiver 18 sets the operation mode to the first smart communication mode when receiving a smart reception request signal Srco having a high level and a smart frequency switch signal Scsel having a low level. The multifunction receiver 18 sets the operation mode to the second smart communication mode when receiving a smart reception request signal Srco having a high level and a smart frequency switch signal Scsel having a high level. Further, the multifunction receiver 18 sets the operation mode to the TPMS communication mode when receiving a smart reception request signal Srco having a low level.

The multifunction receiver 18 includes an antenna switch signal input terminal 35 that receives an antenna switch signal Sasel from the verification ECU 8. The antenna switch signal input terminal 35 is connected to the switch 23. The antenna switch signal Sasel, which is pulse signal having predetermined pulses, requests the multifunction receiver 18 to switch the used reception antennas 22. The switch 23 selects one of the reception antennas 22 based on the antenna switch signal Sasel.

The multifunction receiver 18 also includes an operation switch signal generation circuit 36, which generates various signals used to select an operation mode, and a timer circuit 37, which measures the time elapsed from when the smart frequency switch signal Scsel falls to a low level. The operation switch signal generation circuit 36 includes a trigger signal generation circuit 38, which generates a trigger signal Strg that triggers the switching of operation modes, and a smart reception request signal generation circuit 39, which generates a smart reception request signal Srco-XC. The timer circuit 37 corresponds to a restoration unit, the trigger signal generation circuit 38 corresponds to a trigger signal generation unit, and the smart reception request signal generation circuit 39 corresponds to a switch signal generation unit. Further, the smart reception request signal Srco-XC corresponds to a first operation mode switch signal.

The reception IC 20 includes a first switching terminal 40, a second switching terminal 41, and a trigger input terminal 42. The first switching terminal 40 is connected to the smart reception request signal generation circuit 39. The second switching terminal 41 is connected to the smart frequency switch signal input terminal 34. The second switching terminal 41 is directly provided with the smart frequency switch signal Scsel. The trigger input terminal 42 is connected to the trigger signal generation circuit 38.

The trigger signal generation circuit 38 is connected to the smart reception request signal input terminal 33, the smart frequency switch signal input terminal 34, the timer circuit 37, and the trigger input terminal 42. The trigger signal generation circuit 38 generates a trigger signal Strg when the smart reception request signal Srco and the smart frequency switch signal Scsel falls to a low level or rises to a high level.

The smart reception request signal generation circuit 39 is connected to the smart reception request signal input terminal 33, the smart frequency switch signal input terminal 34, the timer circuit 37, and the first switching terminal 40. When the smart reception request signal generation circuit 39 receives a smart reception request signal Srco in a normal manner from the smart reception request signal input terminal 33, the smart reception request signal generation circuit 39 provides the first switching terminal 40 with a smart reception request signal Srco-XC having the same logic value as the smart reception request signal Srco. If the smart reception request signal generation circuit 39 receives a smart frequency switch signal Scsel when a smart reception request signal Srco is not received in a normal manner from the smart reception request signal input terminal 33, the smart reception request signal generation circuit 39 assumes that the smart reception request signal Srco is fixed. Thus, the smart reception request signal generation circuit 39 generates a new smart reception request signal Srco-XC and provides the first switching terminal 40 with the smart reception request signal Srco-XC.

The TPMS microcomputer 19 is provided with the smart reception request signal Srco-XC from the smart reception request signal generation circuit 39. When the TPMS microcomputer 19 receives a smart reception request signal Srco-XC having a low level, the TPMS microcomputer 19 determines that the operation mode has been set to the TPMS communication mode. In this case, the TPMS microcomputer 19 performs tire pressure monitoring when an ignition ON signal is received from an ignition switch (not shown).

The timer circuit 37 compares a measured time Tx, which is the time elapsed from when the smart frequency switch signal Scsel falls to a low level, with a threshold Tk. When the measured time Tx is greater than or equal to the threshold Tk, that is, when the pulse of the smart frequency switch signal Scsel does not shift for a certain time, the timer circuit 37 provides a TPMS restoration request signal Srt to the trigger signal generation circuit 38 and the smart reception request signal generation circuit 39. The TPMS restoration request signal Srt requests the multifunction receiver 18 to return the operation mode to the TPMS communication mode.

The reception IC 20 includes a mode setting unit 43 that sets the operation mode based on the smart reception request signal Srco-XC, the smart frequency switch signal Scsel, and the trigger signal Strg. If the mode setting unit 43 receives a trigger signal Strg when receiving a smart reception request signal Srco-XC having a high level, the mode setting unit 43 sets the operation mode to the smart communication mode. In contrast, if the mode setting unit 43 receives a trigger signal Strg when receiving a smart reception request signal Srco-XC having a low level, the mode setting unit 43 sets the operation mode to the TPMS reception mode.

In the smart communication mode, if the mode setting unit 43 receives a trigger signal Strg when receiving a smart frequency switch signal Scsel having a high level, the mode setting unit 43 switches the operation mode from the first smart communication mode to the second smart communication mode. Further, in the smart communication mode, if the mode setting unit 43 receives a trigger signal Strg when receiving a smart frequency switch signal Scsel having a low level, the mode setting unit 43 returns the operation mode to the first smart communication mode from the second smart communication mode. The mode setting unit 43 corresponds to a mode setting unit.

The operation of the multifunction receiver 18 in the present example will now be described with reference to FIGS. 1 to 7.

Normal Operation: Control Using Only Smart Reception Request Signal

Figure 2:
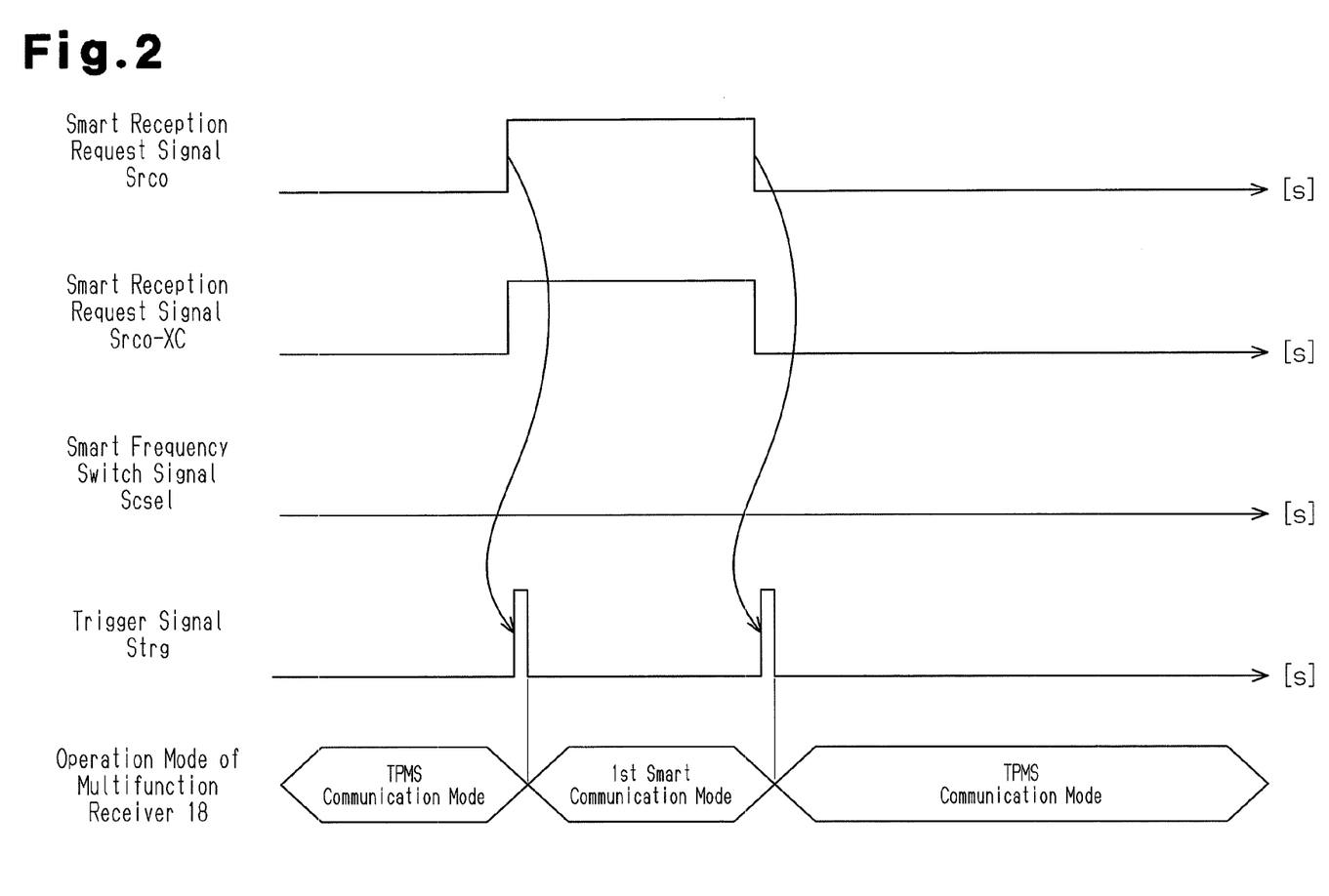
FIG. 2 is a timing chart of the communication performed when controlling a multifunction receiver with only a smart reception request signal under a normal situation.

Referring to FIG. 2, when the vehicle power is set to IG ON, that is, when the engine of the vehicle 1 is running, the verification ECU 8 provides the multifunction receiver 18 with a smart reception request signal Srco having a low level and a smart frequency switch signal Scsel having a low level. When the mode setting unit 43 of the multifunction receiver 18 receives the smart reception request signal Srco having a low level and the smart frequency switch signal Scsel having a low level, the mode setting unit 43 sets the operation mode to the TPMS communication mode. When the TPMS microcomputer 19 receives a smart reception request signal Srco-SC having a low level, the TPMS microcomputer 19 monitors the tire pressure. Thus, the multifunction receiver 18 sets the reception frequency to the same frequency as the transmission frequency of the tire pressure sensors 5 to receive tire pressure signals Stp from the tire pressure sensors 5.

Referring to FIG. 1, when the vehicle 1 starts to travel, the controller 14 of each tire pressure sensor 5 detects rotation of the corresponding tire 4 based on the detection signal of the acceleration sensor 16 and transmits a tire pressure sensor signal Stp from the transmitter 17. The four tire pressure sensors 5 of the four wheels transmit tire pressure signals Stp at different times to avoid cross talk.

Since the operation mode is set in the TPMS communication mode, the multifunction receiver 18 receives the tire pressure signal Stp from each tire pressure sensor 5. The reception IC 20 provides the TPMS microcomputer 19 with the tire pressure signal Stp received by the reception antenna 22. The TPMS microcomputer 19 verifies the tire ID in the tire pressure signal Stp. When the tire ID is verified, the TPMS microcomputer 19 checks the tire pressure data in the tire pressure signal Stp. When the tire pressure is less than or equal to a specified value, the TPMS microcomputer provides the body ECU 9 with a tire abnormality notification request. When the body ECU 9 receives a tire abnormality notification request from the TPMS microcomputer 19, the body ECU 9, for example, generates a message on the instrument panel or the like in the vehicle 1 to notify the driver that the tire pressure is less than or equal to the specified value.

A case in which the vehicle 1 is parked or stopped will now be described.

As shown in FIG. 2, when smart verification is performed, the verification ECU 8 provides the multifunction receiver 18 with a smart reception request signal Srco having a high level. The multifunction receiver 18 receives the smart reception request signal Srco having a high level with the smart reception request signal input terminal 33. The smart reception request signal generation circuit 39 determines that the smart reception request signal Srco has risen to a high level and provides the reception IC 20 with a smart reception request signal Srco-XC having the same logic value as the smart reception request signal Srco.

Further, the trigger signal generation circuit 38 provides the reception IC 20 with a trigger signal Strg when the smart reception request signal Srco rises to a high level.

The mode setting unit 43 receives the smart reception request signal Srco-XC having a high level from the first switching terminal 40 and a smart frequency switch signal Scsel having a low level from the second switching terminal 41. When the mode setting unit 43 receives the trigger signal Strg from the trigger input terminal 42, the mode setting unit 43 sets the operation mode to the first smart communication mode. Further, the TPMS microcomputer 19 receives the smart reception request signal Srco-XC having a high level and stops monitoring the tire pressure.

In the first smart communication mode, when the electronic key 2 is located outside the vehicle 1, the exterior transmitter 12 transmits an ID response request signal Srq on a first frequency (low frequency) out of the vehicle 1. When the electronic key 2 receives the request signal Srq, the electronic key 2 transmits an ID signal Sid to the multifunction receiver 18. When the multifunction receiver 18 receives the ID signal Sid, the multifunction receiver 18 provides the verification ECU 8 with the ID signal Sid. The verification ECU 8 performs ID verification (vehicle exterior smart verification) with the ID signal Sid and permits the locking and unlocking of vehicle doors when the verification is accomplished. When the electronic key 2 is located inside the vehicle 1, the interior transmitter 13 transmits a request signal Srq, and the verification ECU 8 performs ID verification (vehicle interior smart verification) in the same manner as when the electronic key 2 is located outside the vehicle 1. When the verification is accomplished, the verification ECU 8 allows the engine to be started with the engine switch 44.

Referring to FIG. 2, when the verification ECU 8 determines that smart verification does not have to be performed, the verification ECU 8 generates a smart reception request signal Srco having a low level. The reception IC 20 is provided with the smart reception request signal Srco having a low level from the smart reception request signal generation circuit 39. The trigger signal generation circuit 38 provides the reception IC 20 with a trigger signal when the smart reception request signal Srco falls to a low level.

If the mode setting unit 43 receives a trigger signal Strg from the trigger input terminal 42 when receiving the smart reception request signal Srco having a low level from the first switching terminal 40, the mode setting unit 43 switches the operation mode from the first smart communication mode to the TPMS communication mode. Further, when the vehicle power is set to IG ON, the TPMS microcomputer 19 receives a smart reception request signal Srco-XC having a low level and starts monitoring the tire pressure. Thus, the multifunction receiver 18 functions in the TPMS communication mode to receive a tire pressure signal Stp from each tire pressure sensor 5.

Normal Operation: Control Using Smart Reception Request Signal and Smart Frequency Switch Signal In this control, when the electronic key 2 receives smart verification radio waves from the vehicle 1, the electronic key 2 first transmits radio waves on the first frequency. When there is no response from the vehicle 1, the electronic key 2 transmits radio waves on the second frequency.

Figure 3:
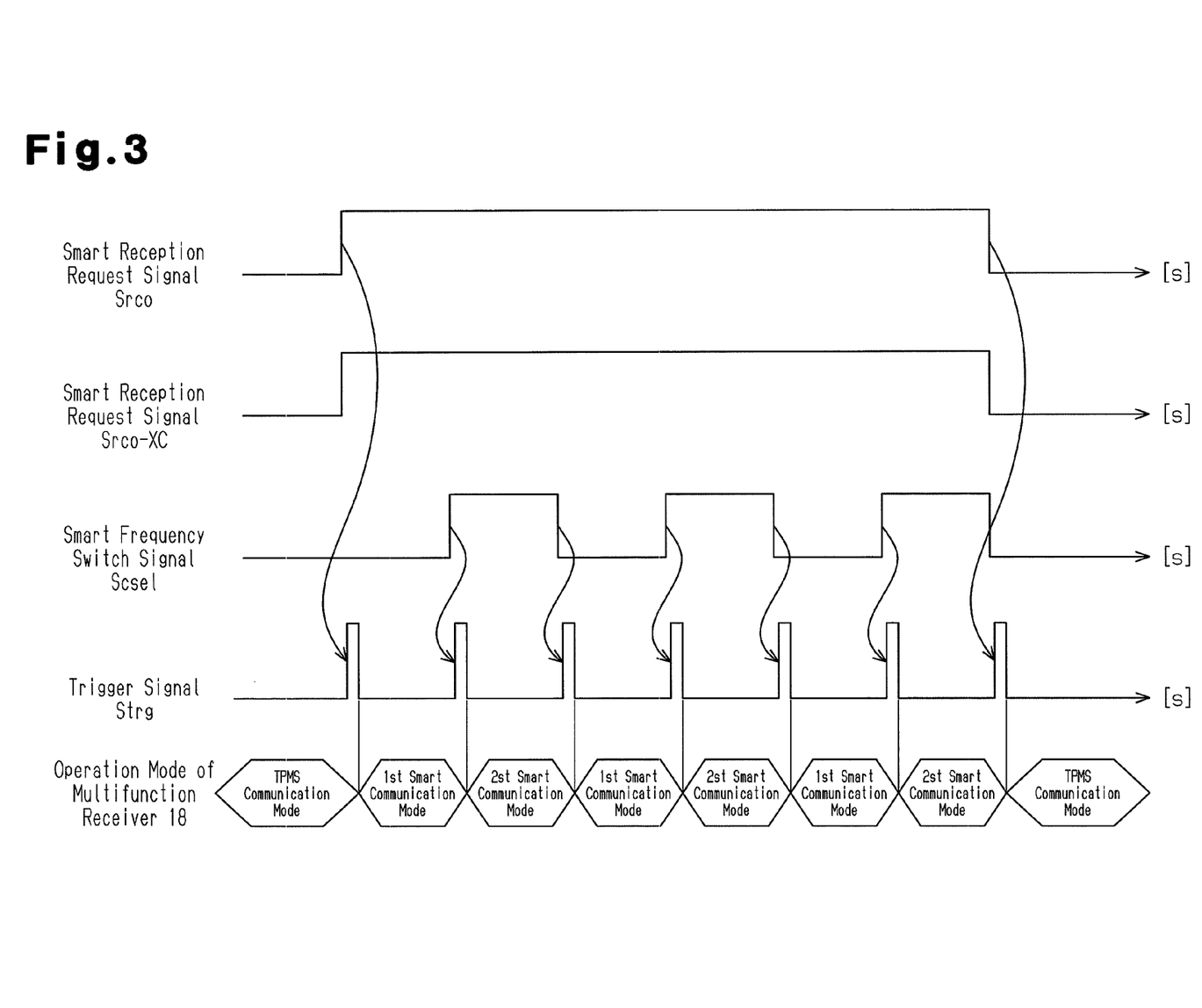
FIG. 3 is a timing chart of the communication performed when controlling the multifunction receiver with a smart reception request signal and a smart frequency under a normal situation.

Referring to FIG. 3, in the TPMS communication mode, the mode setting unit 43 receives a smart reception request signal Srco-XC having a high level from the first switching terminal and a trigger signal Strg from the trigger input terminal 42. When the trigger signal Strg is received from the trigger input terminal 42, the mode setting unit 43 switches the operation mode from the TPMS communication mode to the first smart communication mode. When switched to the first smart communication mode, the multifunction receiver 18 sets the reception frequency to the first frequency. The verification ECU 8 determines whether or not smart communication can be established with the first frequency. When determining that smart communication cannot be established with the first frequency, the verification ECU 8 provides the multifunction receiver 18 with a smart frequency switch signal Scsel having a high level. For example, when radio waves cannot be received within a preset time or when noise is detected, the verification ECU 8 determines that smart communication cannot be established with the first frequency.

The trigger signal generation circuit 38 receives the smart frequency switch signal Scsel having a high level from the verification ECU 8. When the smart frequency switch signal Scsel rises to a high level, the trigger signal generation circuit 38 provides a trigger signal Strg to the reception IC 20.

When the mode setting unit 43 receives a smart reception request signal Srco-XC having a high level from the first switching terminal 40 and the smart frequency switch signal Scsel having a high level from the second switching terminal 41, the mode setting unit 43 switches the operation mode from the first smart communication mode to the second smart communication mode. As a result, the multifunction receiver 18 sets the reception frequency to the second frequency to perform smart communication.

Subsequently, the verification ECU 8 periodically and alternately switches the operation mode of the multifunction receiver 18 to the first smart communication mode and the second smart communication mode to perform smart verification.

When determining that smart verification does not have to be performed, the verification ECU 8 generates a smart reception request signal Srco having a low level and a smart frequency switch signal Scsel having a low level. The reception IC 20 receives the smart reception request signal Srco having a low level and the smart frequency switch signal Scsel having a low level from the verification ECU 8. The trigger signal generation circuit 38 receives the smart reception request signal Srco having a low level and the smart frequency switch signal Scsel having a low level from the verification ECU 8. When the smart reception signal Srco falls to a low level or the smart frequency switch signal Scsel falls to a low level, the trigger signal generation circuit 38 provides the reception IC 20 with a trigger signal Strg.

If the mode setting unit 43 receives a trigger signal Strg when receiving a smart reception request signal Srco-XC having a low level from the first switching terminal 40, the mode setting unit 43 switches the operation mode of the reception IC 20 from the second smart communication mode to the TPMS communication mode. Further, when the vehicle power is set to IG ON, the TPMS microcomputer 19 receives the smart reception request signal Srco-XC having a low level and starts monitoring the tire pressure. As a result, the multifunction receiver 18 functions as a receiver for the tire pressure monitoring system 7.

Operation When Smart Reception Request Signal is Fixed to Low Level

Figure 4:
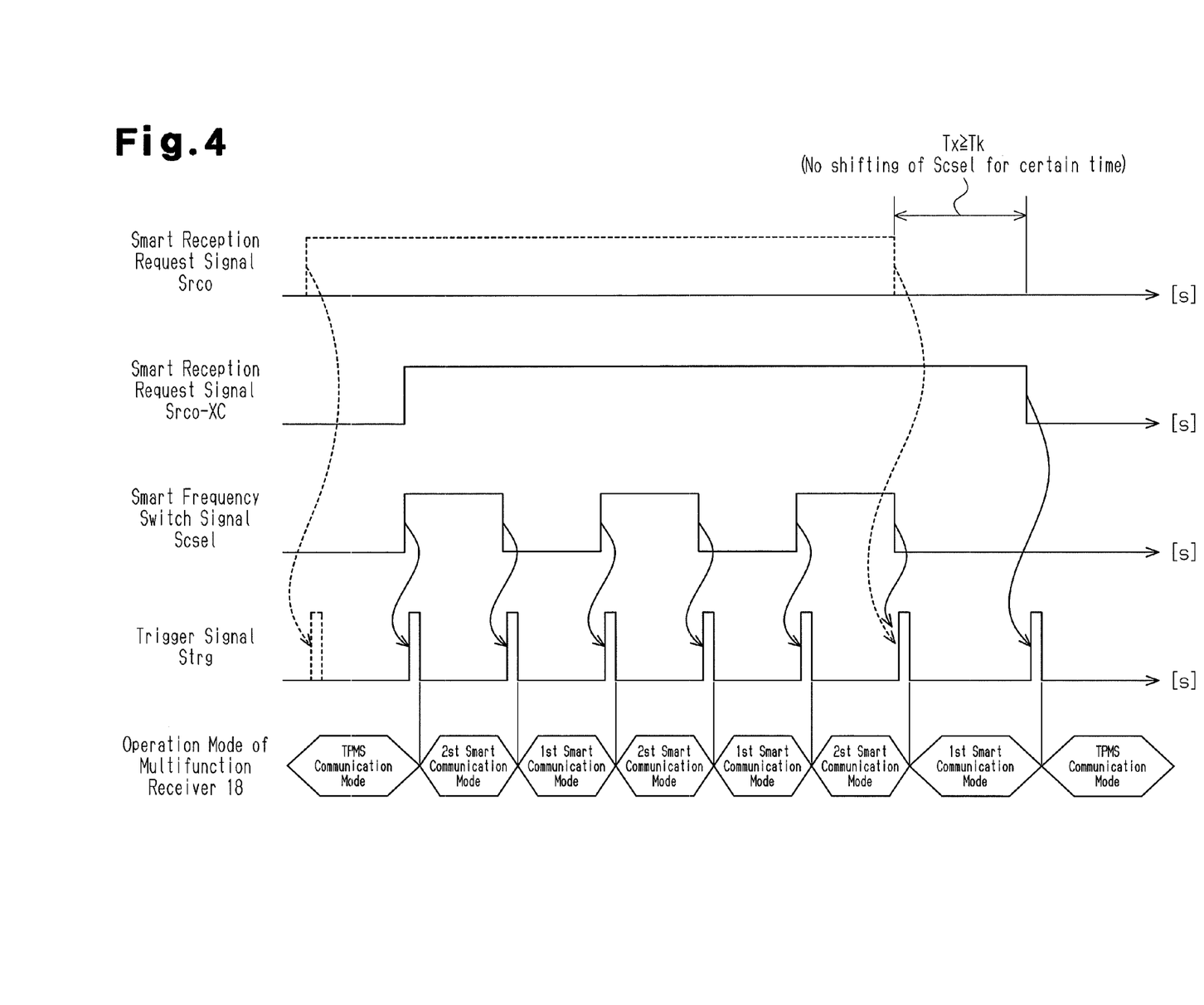
FIG. 4 is a timing chart of the communication performed when controlling the multifunction receiver with a smart reception request signal fixed at a low level.

Referring to FIG. 4, when a smart reception request signal Srco is fixed to the low level, the verification ECU 8 continues to generate the smart reception request signal Srco at a low level even when determining to change the operation mode of the multifunction receiver 18 from the TPMS communication mode to the first smart communication mode. The operation switch signal generation circuit 36 generates a smart reception request signal Srco-XC having a low level in correspondence with the smart reception request signal Srco having the low level. Accordingly, when the smart reception request signal Srco is fixed to the low level, the verification ECU 8 cannot change the operation mode of the multifunction receiver 18 from the TPMS communication mode to the first smart communication mode.

If a predetermined time elapses from when determining that smart communication cannot be established with the first frequency, the verification ECU 8 provides the multifunction receiver 18 with a smart frequency switch signal Scsel having a high level to switch the operation mode from the first smart communication mode to the second smart communication mode. When receiving the smart reception request signal Srco at the low level and the smart frequency switch signal Scsel at the high level, the smart reception request signal generation circuit 39 determines that the smart reception request signal Srco is fixed at the low level and generates a new smart reception request signal Srco-XC at a high level. When the smart frequency switch signal Scsel rises to a high level, the trigger signal generation circuit 38 provides the reception IC 20 with a trigger signal Strg.

If the mode setting unit 43 receives a trigger signal Strg having a high level when receiving the smart reception request signal Srco-XC having a high level from the first switching terminal 40 and the smart frequency switch signal Scsel having a high level from the second switching terminal 41, the mode setting unit 43 switches the operation mode from the TPMS communication mode to the second smart communication mode. That is, when the smart reception request signal Srco is fixed to the low level, the multifunction receiver 18 is able to switch the operation mode from the TPMS communication mode to the second smart communication mode. Subsequently, the verification ECU 8 alternately switches the operation mode of the multifunction receiver to the first smart communication mode and the second smart communication mode to perform smart communication.

When the smart reception request signal Srco is fixed to the low level and the verification ECU 8 determines that smart verification does not have to be performed, the verification ECU 8 maintains the smart reception request signal Srco at the low level, maintains the smart reception request signal Srco-XC at the high level, and switches only the smart frequency switch signal Scsel from the high level to the low level.

The reception IC 20 receives the smart reception request signal Srco-XC having a high level and the smart frequency switch signal Scsel having a low level. When the smart frequency switch signal Scsel falls to a low level, the trigger signal generation circuit 38 provides the reception IC 20 with a trigger signal Strg.

The mode setting unit 43 receives the smart reception request signal Srco-XC having a high level from the first switching terminal 40 and the smart frequency switch signal Scsel having a low level from the second switching terminal 41. When the mode setting unit 43 receives a trigger signal Strg having a high level from the trigger input terminal 42, the mode setting unit 43 switches the operation mode from the second smart communication mode to the first smart communication mode. Accordingly, the verification ECU 8 switches the operation mode from the second smart communication mode to the first smart communication mode and then switches the operation mode from the first smart communication mode to the TPMS communication mode.

The timer circuit 37 measures the time elapsed from when the smart frequency switch signal Scsel falls to a low level. When the measured time Tx becomes greater than or equal to a threshold Tk, the timer circuit 37 provides a TPMS restoration request signal Srt to the trigger signal generation circuit 38 and the smart reception request signal generation circuit 39. When the smart reception request signal generation circuit 39 receives the TPMS restoration request signal Srt from the timer circuit 37, the smart reception request signal generation circuit 39 generates a smart reception request signal Srco-XC having a low level. The reception IC 20 receives the smart reception request signal Srco-XC having a low level from the first switching terminal 40. Further, when the trigger signal generation circuit 38 receives the TPMS restoration request signal Srt from the timer circuit 37, the trigger signal generation circuit 38 provides the reception IC 20 with a trigger signal Strg. The reception IC 20 receives the trigger signal Strg from the trigger input terminal 42.

If the mode setting unit 43 receives a trigger signal Strg from the trigger input terminal 42 when receiving the smart reception request signal Srco-XC having a low level from the first switching terminal 40, the mode setting unit 43 switches the operation mode from the first smart communication mode to the TPMS communication mode. Thus, the operation mode of the multifunction receiver 18 returns to the TPMS communication mode, and the multifunction receiver 18 functions as a receiver for the tire pressure monitoring system 7.

Operation When Smart Reception Request Signal is Fixed to High Level

Figure 5:
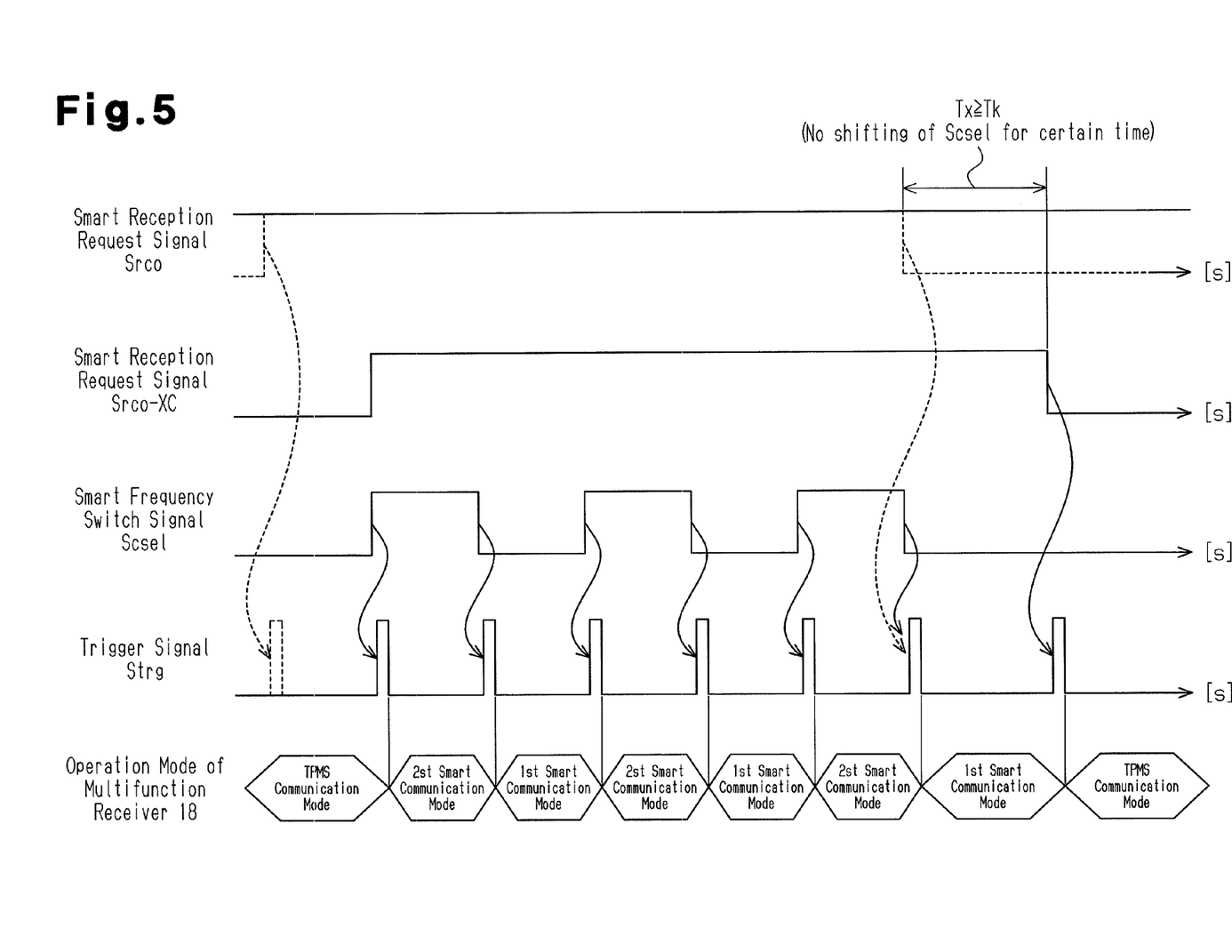
FIG. 5 is a timing chart of the communication performed when controlling the multifunction receiver with a smart reception request signal fixed at a high level.

Referring to FIG. 5, the verification ECU 8 determines to change the operation mode of the multifunction receiver 18 from the TPMS communication mode to the first smart communication mode and generates a smart reception request signal Srco having a high level. Since the smart reception request signal Srco does not rise when fixed to the high level, the operation switch signal generation circuit 36 continues to generate a smart reception request signal Srco-XC having a low level. Accordingly, when the smart reception request signal Srco is fixed to a high level, the verification ECU 8 cannot switch the operation mode of the multifunction receiver 18 with the smart reception request signal Srco.

When a predetermined time elapses after the verification ECU 8 determines that smart communication cannot be established with the first frequency, the verification ECU 8 provides the multifunction receiver 18 with a smart frequency switch signal Scsel having a high level to change the operation mode from the first smart communication mode to the second smart communication mode. Subsequently, the multifunction receiver 18 functions in the same manner as when the smart reception request signal Srco is fixed to the low level. Thus, the multifunction receiver 18 is set to each operation mode.

Operation When Smart Frequency Switch Signal is Fixed to High Level

Figure 6:
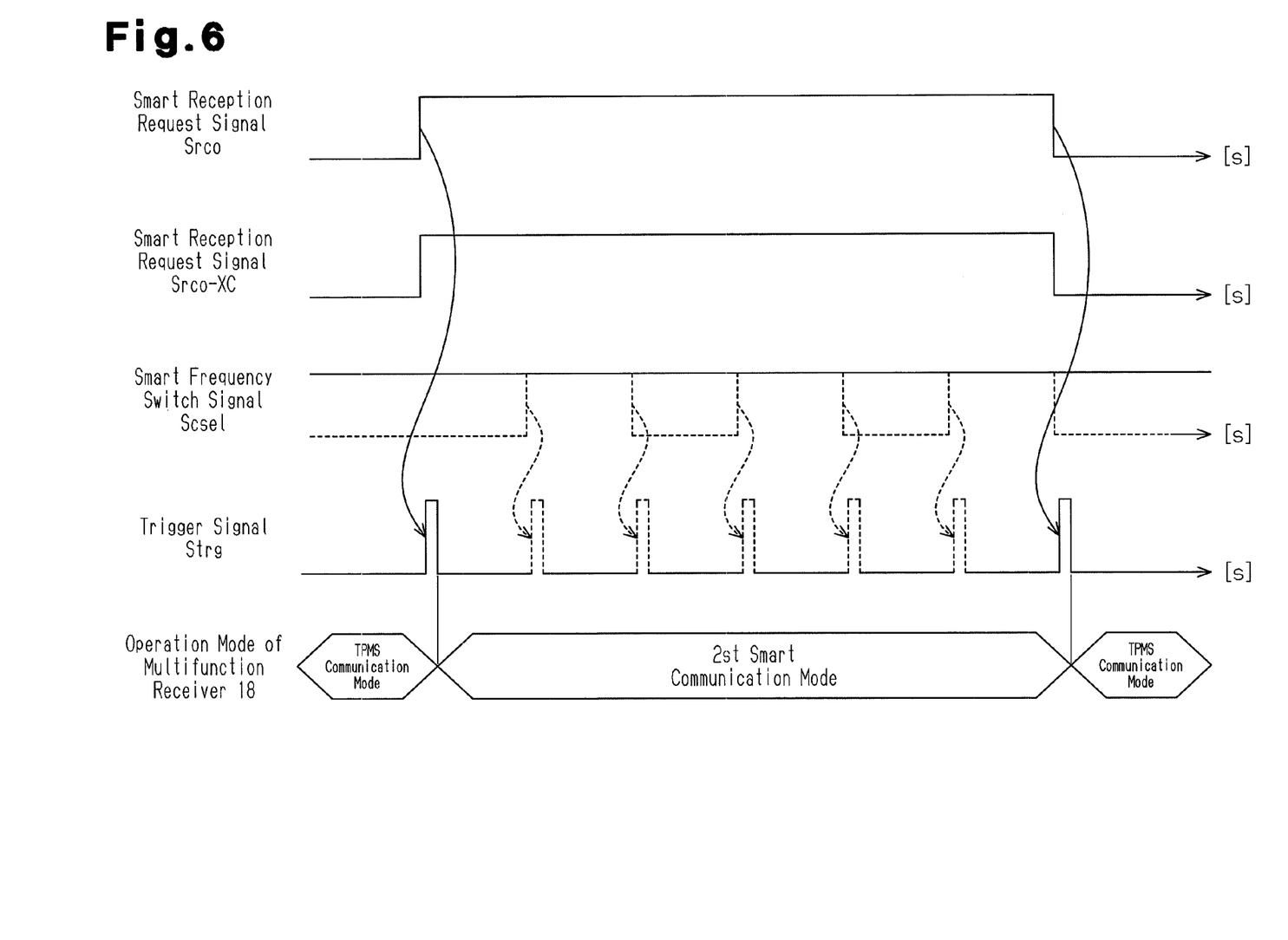
FIG. 6 is a timing chart of the communication performed when controlling the multifunction receiver with a smart frequency switch signal fixed at a high level.

Referring to FIG. 6, when the smart frequency switch signal Scsel is fixed to a high level, the second switching terminal 41 of the reception IC 20 is continuously provided with the smart frequency switch signal Scsel having the high level regardless of the operation of the verification ECU 8.

The verification ECU 8 determines to switch the operation mode of the multifunction receiver 18 from the TPMS communication mode to the smart communication mode and provides the multifunction receiver 18 with a smart reception request signal Srco having a high level. The mode setting unit 43 receives the smart reception request signal Srco having a high level from the first switching terminal 40 and receives the smart frequency switch signal Scsel having the high level from the second switching terminal 41. When the mode setting unit 43 receives a trigger signal Strg from the trigger input terminal 42, the mode setting unit 43 switches the operation mode from the TPMS communication mode to the second smart communication mode. That is, the operation mode of the reception IC 20 is directly switched from the TPMS communication mode to the second smart communication mode, and the first smart communication mode is not set.

At a certain point of time after switching to the second smart communication mode, the verification ECU 8 assumes that the operation mode of the multifunction receiver 18 has been switched from the second smart communication mode to the first communication mode. However, when the smart frequency switch signal Scsel is fixed to the high level, the verification ECU 8 cannot generate a smart frequency switch signal Scsel having a low level and continues to provide the reception IC 20 with a smart frequency switch signal Scsel having a high level. Thus, the trigger signal generation circuit 38 cannot generate a trigger signal Strg when the smart frequency switch signal Scsel falls to a low level. Accordingly, the operation mode remains in the second smart communication mode.

Subsequently, even when determining to switch the operation mode of the multifunction receiver 18 from the second smart communication mode to the first smart communication mode, the verification ECU 8 continues to generate the smart frequency switch signal Scsel having the high level. Accordingly, the operation mode remains in the second smart communication mode. The multifunction receiver 18 successively receives radio waves on the second frequency.

When determining that smart verification does not have to be performed, the verification ECU 8 provides the multifunction receiver 18 with a smart reception request signal Srco having a low level. The smart reception request signal generation circuit 39 provides the reception IC 20 with a smart reception request signal Srco-XC having a low level in accordance with the smart reception request signal Srco having a low level. When the smart frequency switch signal Scsel is fixed to the high level, the reception IC 20 is continuously provided with the smart frequency switch signal Scsel having the high level. However, this does not cause any problems since the smart frequency switch signal Scsel is irrelevant to the switching of the operation mode to the TPMS communication mode. Further, the trigger signal generation circuit 38 provides the reception IC 20 with the trigger signal Strg when the smart reception request signal Srco falls to the low level.

If the mode setting unit 43 receives a trigger signal Strg from the trigger input terminal 42 when receiving the smart reception request signal Srco-XC having a low level from the first switching terminal 40, the mode setting unit 43 switches the operation mode from the second smart communication mode to the TPMS communication mode. Accordingly, the operation mode returns to the TPMS communication mode, and the multifunction receiver 18 functions as a receiver for the tire pressure monitoring system 7.

Operation When Smart Frequency Switch Signal is Fixed to Low Level

Figure 7:
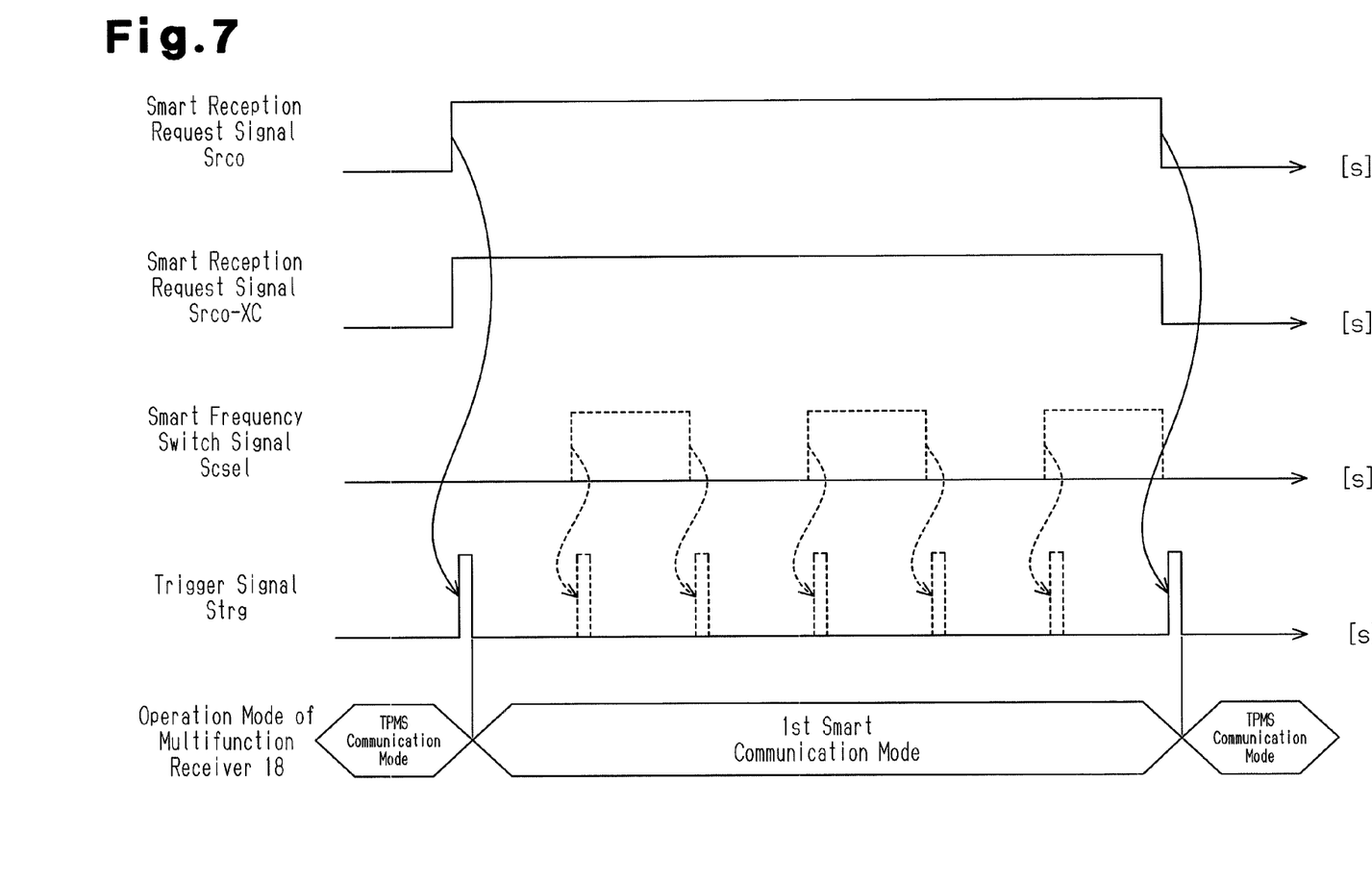
FIG. 7 is a timing chart of the communication performed when controlling the multifunction receiver with a smart frequency switch signal fixed at a low level.

Referring to FIG. 7, when the smart frequency switch signal Scsel is fixed to the low level, the verification ECU 8 continues to generate the smart frequency switch signal Scsel at a low level. Accordingly, the second switching terminal 41 of the reception IC 20 is provided with the smart frequency switch signal Scsel having a low level regardless of the operation of the verification ECU 8.

The verification ECU 8 determines to switch the operation mode of the multifunction receiver 18 from the TPMS communication mode to the smart communication mode, and provides the multifunction receiver 18 with a smart reception request signal Srco having a high level. The mode setting unit 43 receives a smart reception request signal Srco-XC having a high level from the first switching terminal 40 and the smart frequency switch signal Scsel having a low level from the second switching terminal 41. When the mode setting unit 43 receives a trigger signal Strg from the trigger input terminal, the mode setting unit 43 switches the operation mode from the TPMS communication mode to the first smart communication mode.

At a certain point of time after switching to the first smart communication mode, the verification ECU 8 assumes that the operation mode of the multifunction receiver 18 has been switched from the first smart communication mode to the second communication mode. When the smart frequency switch signal Scsel is fixed to the low level, the verification ECU 8 continues to generate a smart frequency switch signal Scsel having a low level even when determining to switch the operation mode of the multifunction receiver 18 from the first smart communication mode to the second smart communication mode. The trigger signal generation circuit 38 does not function when the smart frequency switch signal Scsel rises to a high level, and the reception IC 20 cannot be supplied with the trigger signal Strg. Thus, the operation mode remains in the first smart communication mode.

Subsequently, even when determining to switch the operation mode of the multifunction receiver 18 from the first smart communication mode to the second smart communication mode, the verification ECU 8 continues to generate the smart frequency switch signal Scsel having the low level. Accordingly, the operation mode remains in the first smart communication mode. The multifunction receiver 18 successively receives radio waves on the first frequency. When the verification ECU 8 generates a smart reception request signal Srco having a low level, the verification ECU 8 returns the operation mode from the first smart communication mode to the TPMS communication mode.

The present embodiment has the advantages described below.

(1) The multifunction receiver 18 includes the trigger signal generation circuit 38 that generates a trigger signal Strg when the smart reception request signal Srco or the smart frequency switch signal Scsel fall to a low level or rises to a high level. The reception IC 20 switches the operation mode when receiving a trigger signal Strg. Thus, even when the smart reception request signal Srco or the smart frequency switch signal Scsel is fixed to the high level or the low level, a trigger signal Strg may be generated by a normal one of the smart reception request signal Srco and the smart frequency switch signal Scsel, and the operation mode of the multifunction receiver 18 may switch the operation mode of the multifunction receiver 18 to the TPMS communication mode or the smart communication mode based on the trigger signal Strg and the normal signal. Accordingly, even if the smart reception request signal Srco or the smart frequency switch signal Scsel becomes fixed, the multifunction receiver 18 is able to receive radio waves in each mode.

(2) Even when the smart reception request signal Srco becomes fixed, the multifunction receiver 18 is not fixed to the TPMS communication mode or the smart communication mode. Thus, the multifunction receiver 18 is able to receive radio waves in each mode.

(3) When the verification ECU 8 generates a smart reception request signal Srco having a low level, the operation mode of the multifunction receiver 18 is set to the basic TPMS communication mode. When the smart reception request signal Srco is switched from the low level to the high level, the operation mode of the multifunction receiver 18 is switched from the TPMS communication mode to the smart communication mode. In the TPMS mode, which is set to be longer than the smart communication mode, the verification ECU 8 generates the smart reception request signal Srco at a low level. This reduces the consumed power of the battery.

(4) The multifunction receiver 18 includes the smart reception request signal generation circuit 39. Even when the smart reception request signal Srco is fixed to the high level or the low level, the smart reception request signal generation circuit 39 provides the reception IC 20 with a smart reception request signal Srco-XC in lieu of the smart reception request signal Srco. Thus, even when the smart reception request signal Srco is fixed to the high level or the low level, the multifunction receiver 18 properly switches the operation mode to the TPMS communication mode or the smart communication mode.

(5) The timer circuit 37 measures the time from when the operation mode of the multifunction receiver 18 is switched to the smart communication mode to when a smart frequency switch signal Scsel having a high level is generated. When the time measured by the timer circuit 37 exceeds a preset time, the multifunction receiver 18 switches the operation mode to the original TPMS communication mode. Thus, when the smart reception request signal Srco is fixed, after switching the operation mode to the smart communication mode, the multifunction receiver 18 is able to return the operation mode to the original TPMS communication mode at a certain point of time.

It should be apparent to those skilled in the art that the present invention may be embodied in many other specific forms without departing from the spirit or scope of the invention. Particularly, it should be understood that the present invention may be embodied in the following forms.

The smart reception request signal generation circuit 39 may receive the trigger signal Strg. In this case, the smart reception request signal generation circuit 39 generates a smart reception request signal Srco-XC when the trigger signal Strg is received.

Three or more reception antennas 22 may be used.

Smart communication may be performed at any time. There is no limitation to when smart communication is performed.

The electronic key system 3 may bidirectionally transmit radio waves on the same frequency.

The two transmission antennas of the electronic key system 3 may be arranged, for example, at the right side and left side of the vehicle body. In this case, during ID verification, the location of the electronic key 2 outside or inside the vehicle 1 may be determined based on a response from the electronic key 2 to the radio waves transmitted from the two antennas.

The frequency used for the radio waves of the electronic key system 3 may be changed to, for example, the LF band.

Also, the frequency used for the radio waves of the tire pressure monitoring system 7 may be changed to, for example, the LF band.

The electronic key system 3 may be a system that transmits radio waves from the vehicle 1 to the power supply of the electronic key 2 and performs wireless communication within a short distance (communication distance: several centimeters to several tens of centimeters). Such short distance wireless communication systems include, for example, an immobilizer system and a near field communication (NFC) system.

The tire pressure monitoring system 7 may transmit radio waves from an initiator arranged in each tire 4 to the corresponding tire pressure sensor 5.

The multifunction receiver 18 may set the operation mode to the TPMS communication mode when receiving a smart reception request signal Srco having a high level. Further, the multifunction receiver 18 may set the operation mode to the smart communication mode when receiving a smart reception request signal having a low level.

In addition to the frequency, parameters such as the communication format, baud rate, and the demodulation protocol may differ between the first smart communication mode and the second smart communication mode.

The multifunction receiver 18 may set the operation mode to the second smart communication mode when receiving a smart frequency switch signal Scsel having a low level.

Further, the multifunction receiver 18 may set the operation mode to the first smart communication mode when receiving a smart frequency switch signal Scsel having a high level.

The trigger signal generation circuit 38 may generate a trigger signal when the smart reception request signal Srco or the smart frequency switch signal Scsel rises to a high level or falls to a low level.

The verification control unit may be an ECU other than the verification ECU 8.

The first operation mode switch signal may be changed to another signal such as a TPMS reception request signal.

The first operation mode switch signal may be a signal that requests for the switching of specific actions during the TPMS communication mode or a signal that requests for the switching of specific actions during the smart communication mode.

The second operation mode switch signal may be changed to another signal, such as a signal that requests for the switching of communication formats during smart communication.

The first operation mode switch signal and the second operation mode switch signal may be output from different ECUs.

In addition to a gasoline vehicle, the vehicle 1 may be a hybrid vehicle, a plug-in hybrid vehicle, an electric vehicle, a fuel cell vehicle, and the like.

The present examples and embodiments are to be considered as illustrative and not restrictive, and the invention is not to be limited to the details given herein, but may be modified within the scope and equivalence of the appended claims.

The invention claimed is:

1. A multifunction receiver shared by an electronic key system and a tire pressure monitoring system, wherein the electronic key system verifies an electronic key with a verification controller of a vehicle body through wireless communication, and the tire pressure monitoring system monitors tire pressure of a tire by transmitting a tire pressure signal from a sensor arranged on the tire to the vehicle body through wireless communication, the multifunction receiver comprising:

a trigger signal generator that generates a trigger signal when a level shift occurs in at least one of a first operation mode switch signal and a second operation mode switch signal from the verification controller; and a mode setter that sets an operation mode based on the first operation mode switch signal and the second operation mode switch signal in response to the trigger signal received from the trigger signal generator, wherein the operation mode set by the mode setter is either one of an electronic key system mode for receiving a signal from the electronic key system and a tire pressure monitoring system mode for receiving a signal from the tire pressure monitoring system, wherein the electronic key system mode includes a first electronic key system mode for receiving a signal from the electronic key system on a first frequency and a second electronic key system mode for receiving a signal from the electronic key system on a second frequency, and when the operation mode is set to the electronic key system mode, in response to the trigger signal, the mode setter selects the first electronic key system mode or the second electronic key system mode based on the second operation mode switch signal.

2. The multifunction receiver according to claim 1, wherein the mode setter switches the operation mode from the tire pressure monitoring system mode to the electronic key system mode based on the first operation mode switch signal in response to the trigger signal, and when the operation mode is set to the electronic key system mode, the mode setter switches from the first electronic key system mode to the second electronic key system mode based on the second operation mode switch signal in response to the trigger signal.

3. The multifunction receiver according to claim 2, wherein when the first operation mode switch signal that is received has a high level, the mode setter switches the operation mode from the tire pressure monitoring system mode to the electronic key system mode in response to the trigger signal, when the second operation mode switch signal that is received has a high level and the operation mode is set in the electronic key system mode, the mode setter switches from the first electronic key system mode to the second electronic key system mode in response to the trigger signal.

4. The multifunction receiver according to claim 1, further comprising a switch signal generator that generates a first operation mode switch signal in which a fixed state is released, when it is determined that the first operation mode switch signal is in the fixed state.

5. The multifunction receiver according to claim 4, wherein the switch signal generator determines that the first operation mode switch signal is in the fixed state when the second operation mode switch signal shifts levels and the operation mode is set to the tire pressure monitoring system mode.

6. The multifunction receiver according to claim 4, further comprising a restorer that measures time from when the second operation mode switch signal shifts levels while the operation mode is set to the electronic key system mode, wherein when the measured time becomes greater than or equal to a threshold, the restorer instructs the switch signal generator to generate the first operation mode switch signal in which the fixed state is released and the trigger signal generator to generate the trigger signal so that the operation mode is switched from the electronic key system mode to the tire pressure monitoring system mode.

7. A multifunction receiver shared by an electronic key system and a tire pressure monitoring system, wherein the electronic key system verifies an electronic key with a verification controller of a vehicle body through wireless communication, and the tire pressure monitoring system monitors tire pressure of a tire by transmitting a tire pressure signal from a sensor arranged on the tire to the vehicle body through wireless communication, the multifunction receiver comprising:

a trigger signal generates a trigger signal when a level shift occurs in at least one of a first operation mode switch signal and a second operation mode switch signal from the verification controller; and a mode setter that sets an operation mode based on the first operation mode switch signal and the second operation mode switch signal in response to the triggernal received from the trigger signal generator, wherein the operation mode set by the mode setter is one of a first mode and a second mode that includes a first sub-mode and a second sub-mode, the first operation mode switch signal sets the operation mode to the first mode or the second mode, the second operation mode switch signal selects the first sub-mode or the second sub-mode when the operation mode is set to the second mode, and the multifunction receiver further comprises a switch signal generator that determines that the first operation mode switch signal is in the fixed state and generates a first operation mode switch signal in which the fixed state is released, when the second operation mode switch signal shifts levels and the operation mode is set to the first mode.

* * * * *

UNITED STATES PATENT AND TRADEMARK OFFICE
CERTIFICATE OF CORRECTION

PATENT NO. : 9,114,670 B2
APPLICATION NO. : 13/896604
DATED : August 25, 2015
INVENTOR(S) : K. Kumagai It is certified that error appears in the above-identified patent and that said Letters Patent is hereby corrected as shown below:

In the Claims

Column 16, line 29 (claim 7, line 10), please change "signal generates" to -- signal generator that generates --.

Column 16, line 35 (claim 7, line 16), please change "the triggernal" to -- the trigger signal --.

Signed and Sealed this
Fifth Day of July, 2016

Michelle K. Lee
*Director of the United States Patent and Trademark Office*